(12) United States Patent
Lucas

(10) Patent No.: US 8,256,807 B2
(45) Date of Patent: Sep. 4, 2012

(54) IN-BUMPER STORAGE TRAY FOR AUTOMOTIVE VEHICLE

(75) Inventor: Marc Jonathon Lucas, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 50 days.

(21) Appl. No.: 12/861,469

(22) Filed: Aug. 23, 2010

(65) Prior Publication Data

US 2012/0043773 A1 Feb. 23, 2012

(51) Int. Cl.
B60R 19/56 (2006.01)
(52) U.S. Cl. .................. 293/106; 296/26.08; 296/26.09
(58) Field of Classification Search ............... 296/37.16, 296/24.1, 37.2, 37.6; 312/330.1
See application file for complete search history.

(56) References Cited

U.S. PATENT DOCUMENTS

| | | | |
|---|---|---|---|
| 2,739,010 | A | 3/1956 | Rowland |
| 3,933,385 | A | 1/1976 | Sanford et al. |
| 5,150,939 | A | 9/1992 | Simin |
| 5,678,872 | A | 10/1997 | Slater |
| 5,850,135 | A | 12/1998 | Kuki et al. |
| 6,474,715 | B2 * | 11/2002 | Fukushima et al. ......... 296/37.1 |
| 6,601,895 | B1 * | 8/2003 | Tannenbaum et al. ..... 296/26.09 |
| 6,644,707 | B2 | 11/2003 | McLaughlin et al. |
| 6,926,326 | B2 * | 8/2005 | Iyoda et al. ................... 293/149 |
| 7,222,985 | B2 | 5/2007 | Henoch |
| 2001/0022450 | A1 | 9/2001 | Delavalle et al. |
| 2005/0140159 | A1 * | 6/2005 | Barber .......................... 296/37.6 |
| 2006/0049731 | A1 * | 3/2006 | Choi et al. .................. 312/330.1 |
| 2006/0061333 | A1 | 3/2006 | Kranz |
| 2008/0197987 | A1 | 8/2008 | King et al. |
| 2009/0096575 | A1 | 4/2009 | Tieman |
| 2009/0160607 | A1 | 6/2009 | Edwards et al. |
| 2009/0222174 | A1 | 9/2009 | Frommer et al. |
| 2009/0231094 | A1 | 9/2009 | Higgins et al. |

FOREIGN PATENT DOCUMENTS

| | | |
|---|---|---|
| AU | 2008200543 A1 | 8/2009 |
| EP | 2 157 637 A1 | 2/2010 |
| JP | 2009136108 A | 6/2009 |
| WO | 7900630 A1 | 9/1979 |
| WO | 2009035531 A2 | 3/2009 |

* cited by examiner

Primary Examiner — Glenn Dayoan
Assistant Examiner — Pinel Romain
(74) Attorney, Agent, or Firm — David B. Kelley; Brooks Kushman P.C.

(57) ABSTRACT

For conveniently storing items aboard an automotive vehicle, a storage tray is movable between a stowed position housed within a bumper and an access position wherein it extends through an opening in a rear surface of the bumper. A door is attached to the bumper by a hinge connected to a lower edge of the door and is movable relative to the bumper between a closed position closing off the opening when the tray is in the stowed position and an open position permitting movement of the tray to the extended position. The door includes a guide feature that engages the tray when the tray is moved toward the extended position to stabilize movement of the tray.

14 Claims, 2 Drawing Sheets

IN-BUMPER STORAGE TRAY FOR AUTOMOTIVE VEHICLE

BACKGROUND

1. Technical Field

The present invention relates to automotive vehicles, more specifically to a vehicle having a storage tray located in a rear bumper.

2. Background Art

Some types of electrically powered vehicles, such as plug-in hybrids and battery electric vehicles, use a charging cord to connect the vehicle to an off-board power supply when it is necessary to charge/re-charge the on-board batteries. In some cases, the charging cord is carried on board the vehicle while the vehicle is in use so that it is available anywhere that charging of the batteries is desired. If the vehicle charging port or receptacle is located on an exterior panel of the vehicle it may be advantageous to be able to disconnect the cord from the receptacle when it is not being used and store it in the vehicle at some location remote from the receptacle.

It is important to provide secure storage for the charging cord when it is not in use, and also to ensure that the vehicle operator has easy access to the cord when needed. If the charging cord is stored loose in the trunk or other cargo compartment of the vehicle, it may pose a hazard during a collision, as well as be difficult to find when needed, particularly if there are other objects in the trunk or cargo compartment that may be hiding or blocking access to the cord. Even if the charging cord is stored in a bin or sub-compartment within the vehicle cargo compartment, access to that area may be blocked by other objects and so require removal of those other objects in order to reach the charging cord.

SUMMARY

In one disclosed embodiment, apparatus for storing an item aboard an automotive vehicle comprises a vehicle bumper, a movable tray having a stowed position within an interior of the bumper and movable relative to the bumper to an extended position wherein it projects through an opening in a surface of the bumper, and a door movable relative to the bumper between a closed position wherein it closes off the opening when the tray is in the stowed position and an open position wherein the tray may be moved to the extended position. The tray provides secure storage for and convenient access to items such as an electric vehicle charging cord.

In another disclosed embodiment, apparatus for storing an item adjacent a rear bumper of an automotive vehicle comprises a storage tray movable relative to the bumper between a stowed position wherein the tray is housed within an interior of the bumper and an extended position wherein it projects rearward through an opening in a rear surface of the bumper, and a door movable relative to the bumper between a closed position wherein it closes off the opening when the tray is in the stowed position and an open position wherein the tray may be moved to the extended position.

In another disclosed embodiment, apparatus for storing an item aboard an automotive vehicle comprises a rear vehicle bumper, a storage tray having a stowed position forward of a rear surface of the bumper and movable rearwardly to an access position wherein it extends through an opening in the rear surface, and a door attached to the bumper by a hinge connected to a lower edge of the door. The door is movable relative to the bumper between a closed position closing off the opening when the tray is in the stowed position and an open position permitting movement of the tray to the extended position. The door has a guide feature disposed thereon that engages the tray when the tray is moved toward the extended position to stabilize movement of the tray.

BRIEF DESCRIPTION OF THE DRAWINGS

Embodiments of the present invention will now be described by way of example only with reference to accompanying drawings in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
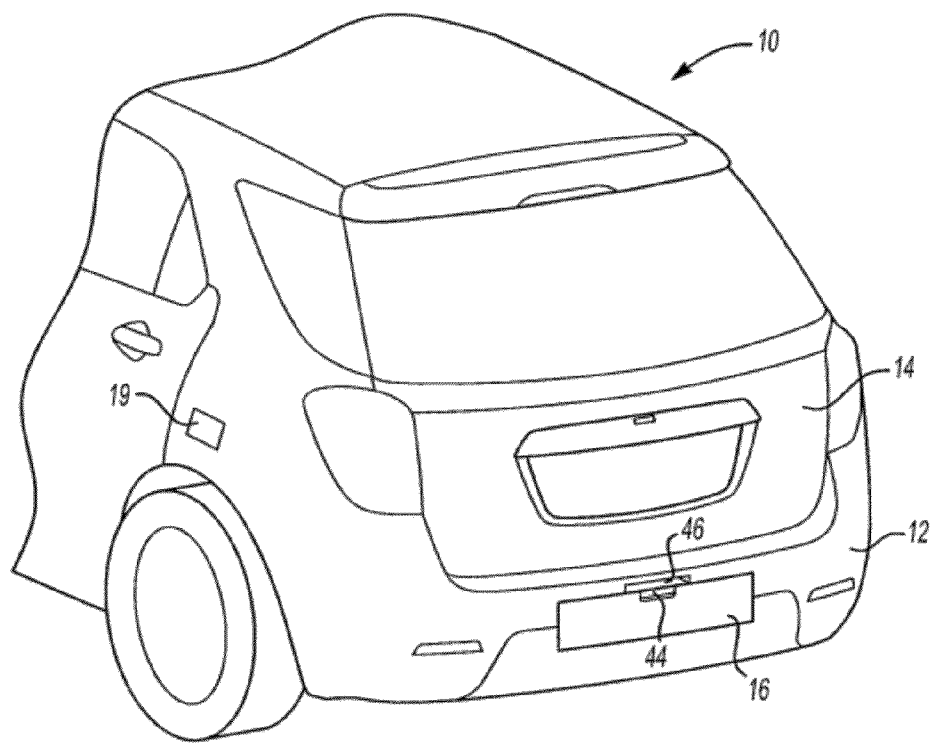
FIG. 1 is a schematic view of an electric vehicle with an in-bumper storage tray.

Referring to FIG. 1, an automotive vehicle 10 has a rear bumper 12 arranged generally below a rear body closure 14, the body closure shown in a closed/lowered position. A door 16 is located on a rear surface of bumper 12 and provides access to a storage compartment within the bumper, as will be described in detail below. A battery charging receptacle 19 may be located on the exterior of the vehicle and may be provided with a cover (not shown) for protection when not in use.

Rear body closure 14 is shown in FIG. 1 as being a rear hatch of the type well known in the automotive industry. However, a storage apparatus as disclosed herein may be used in conjunction with a vehicle having another type of rear body closure, such as a trunk lid.

Figure 2:
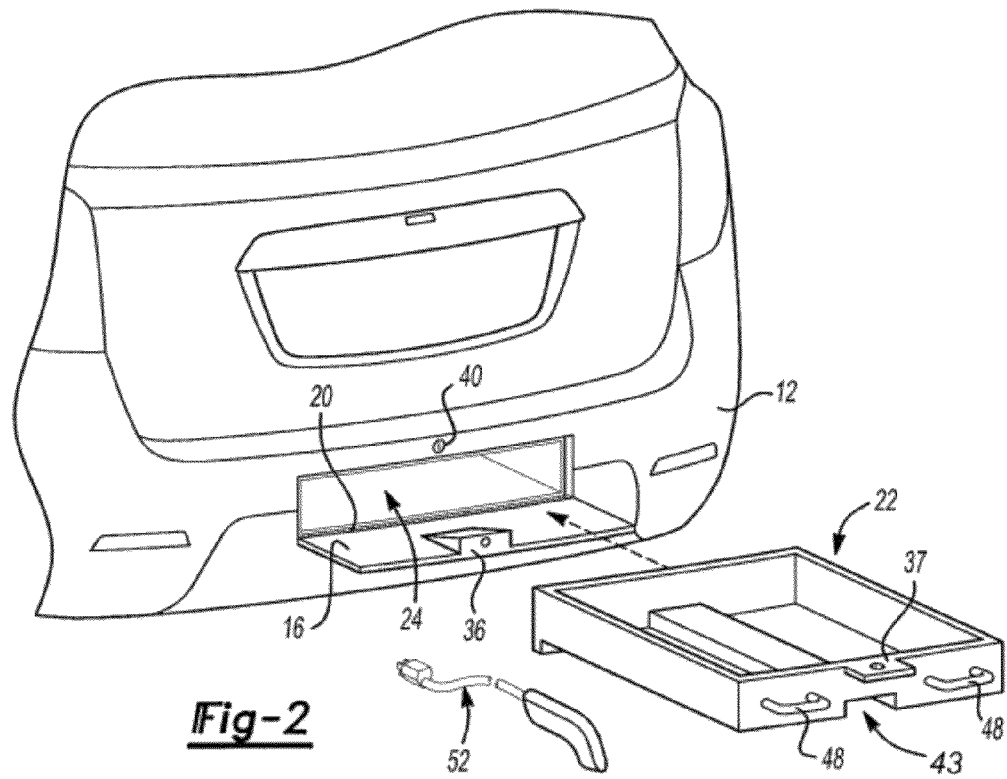
FIG. 2 is a schematic view of the storage tray removed from the vehicle.

As shown in FIG. 2, door 16 is attached to bumper 12 by a hinge 20 extending along all or some portion(s) of the lower edge of the door. Door 16 rotates about hinge 20 between a closed position, seen in FIG. 1, and an open position, seen in FIG. 2. A spring (not shown) may be provided to bias door 16 to the closed position.

In the fully open position, door 16 rotates rearwardly and down to provide an opening that allows access to a compartment 24 inside of bumper 12. A storage tray 22 is adapted to fit through the opening and be housed within compartment 24. Storage tray 22 is sized and configured to hold an electric charging cord 52 (of the type used to charge the batteries of vehicle 10) or other object or objects of similar size.

Figure 3:
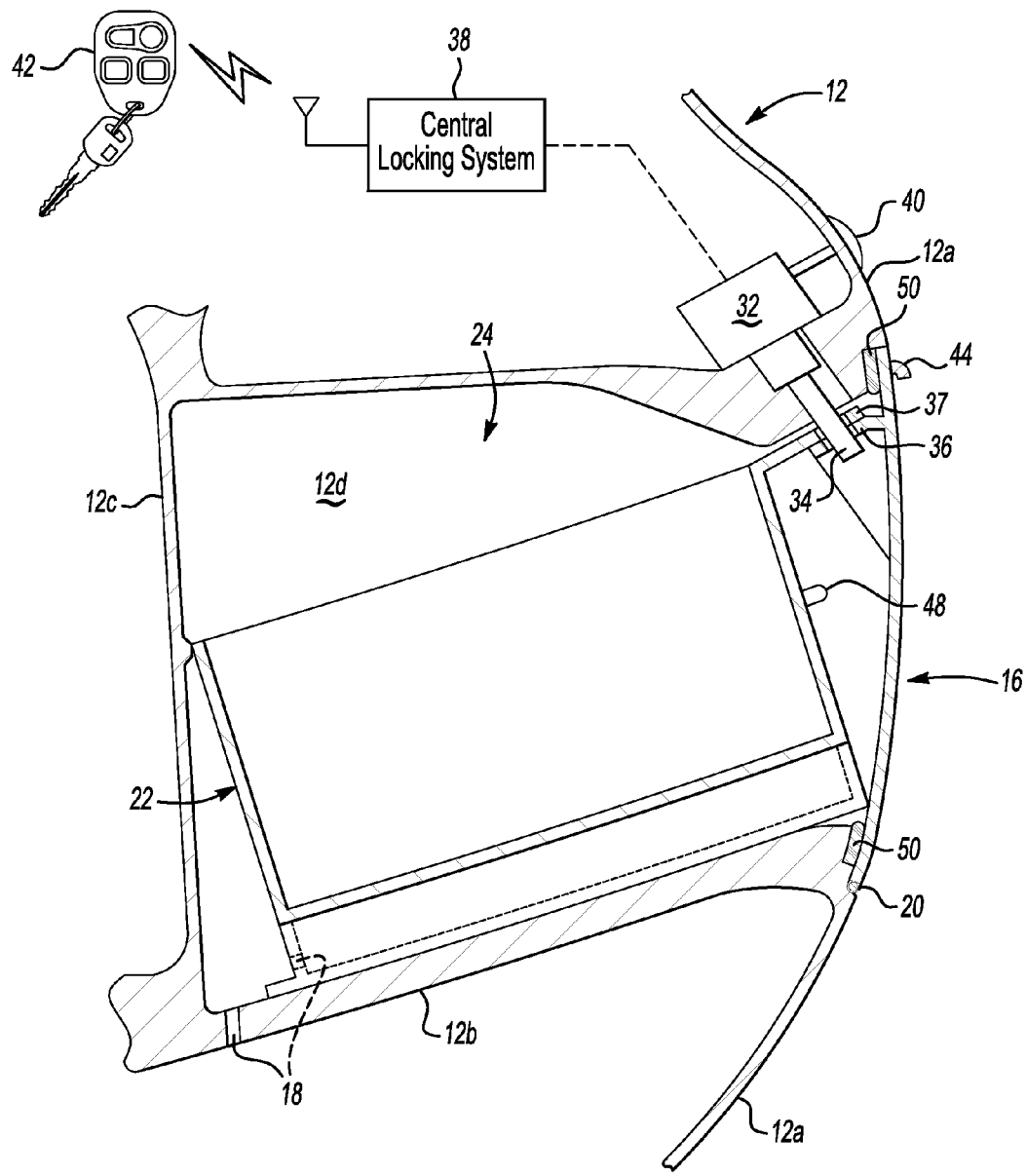
FIG. 3 is a schematic cross-section view of the tray and bumper storage apparatus of FIG. 2.

When in the stowed position (illustrated in FIG. 3), tray 22 is located generally forward of a rear surface 12a of the bumper so that door 16 may be fully closed. Additional structure of bumper 14 may define a completely or partially enclosed compartment. For example, a bottom wall 12b, a forward wall 12c, and/or side walls 12d may form an enclosed or semi-closed space to house tray 22. Alternatively, some portion of the vehicle structure (not shown) supporting bumper 12 may define the space for housing tray 22. Tray 22 may be retained in an inclined or tilted orientation so that any liquid entering the tray can drain out through drain holes 18 formed at appropriate spots in the tray and/or compartment walls.

A locking mechanism 32 may be provided to secure the door 16 and/or tray 22 in their respective closed and stowed positions. Locking mechanism 32 may, as is well known in the automotive arts, be mechanically and/or electrically actuated. For example, mechanism 32 may include a solenoid-actuated locking plunger 34 which, when extended, engages a door locking lug 36 attached to or integral with door 16. A tray locking lug 37 may be provided on tray 22 and may also be engaged by plunger 34.

Locking mechanism 32 may be actuated (locked and/or unlocked) by means of electrical communication from a central locking system 38 and/or by a manually-operated button 40 and/or a key-actuated lock located on the outer surface of bumper 12 or other part of the vehicle. Actuation of locking mechanism 32 may be achieved using a remote control device 42, either via central locking system (as shown) or independently therefrom.

Slides, guide rails, and/or similar structure may be provided on tray 22 and/or the housing to guide the inward and outward motion of the tray. For example, in the depicted embodiment door locking lug 36 is configured to act as a guide post that engages a cut-out 43 formed in the lower portion of tray 22 when door 16 is in the full open position. As tray 22 is pulled rearwardly and passes over door 16, locking lug 36 extends up into cut-out 43 and provides lateral guidance for the tray's movement.

A handle 44 may be located on the exterior of door 16 to allow an operator (not shown) to pull the door to the open position. As an alternative to (or in addition to) handle 44, a recess 46 may be formed adjacent an edge of opening to allow the operator to grip the edge of the door with his/her fingertips and pull it open. One or more handles 48 may also be provided on tray 22 if desired.

Seals 50 may be located around the edge of the opening and/or door 16.

Tray 22 is a convenient and secure place to store a charging cord 52 for a battery electric or plug-in hybrid vehicle, as the tray is easily accessible to the vehicle operator when needed. Charging cord 52 is removed from tray 22, connected with the battery recharging receptacle 19 and with a source of electric power (not shown) to recharge the batteries carried on-board vehicle 10.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed:

1. Storage apparatus for an automotive vehicle comprising:
   a vehicle bumper;
   a tray having a stowed position inside the bumper and movable to an extended position wherein it projects through an opening in the bumper;
   a door movable relative to the bumper between a closed position wherein it closes off the opening when the tray is in the stowed position and an open position wherein the tray is movable to the extended position; and
   a guide feature disposed on an inner surface of the door engaging the tray when the tray is moved toward the extended position to stabilize movement of the tray the guide feature comprising a portion of a locking mechanism for securing the door in the closed position.

2. The apparatus according to claim 1 wherein the locking mechanism is manually releasable by an operator.

3. The apparatus according to claim 1 wherein the locking mechanism is operatively connected with a central vehicle locking system.

4. The apparatus according to claim 1 wherein the locking mechanism is actuated by a remote control device carried by a vehicle operator.

5. The apparatus according to claim 1 wherein the door is attached to the bumper by a hinge connected to a lower edge of the door.

6. Apparatus for storing an item adjacent a rear bumper of an automotive vehicle comprising:
   a storage tray movable relative to the bumper between a stowed position wherein the tray is housed within an interior of the bumper and an extended position wherein it projects rearward through an opening in a rear surface of the bumper; and
   a door movable relative to the bumper between a closed position wherein it closes off the opening when the tray is in the stowed position and an open position wherein the tray may be moved to the extended position, the door having a guide feature comprising a portion of a locking mechanism for securing the door in the closed position, disposed on an inner surface thereof to engage the tray when the tray is moved toward the extended position.

7. The apparatus according to claim 6 further comprising a locking mechanism securing the door in the closed position, the locking mechanism releasable to allow the door to be moved to the open position.

8. The apparatus according to claim 7 wherein the locking mechanism is manually releasable by an operator.

9. The apparatus according to claim 7 wherein the locking mechanism is operatively connected with a central vehicle locking system.

10. The apparatus according to claim 7 wherein the locking mechanism is actuated by a remote control device carried by a vehicle operator.

11. The apparatus according to claim 6 wherein the door is attached to the bumper by a hinge connected to a lower edge of the door.

12. Apparatus for storing an item aboard an automotive vehicle comprising:
    a rear vehicle bumper;
    a storage tray having a stowed position forward of a rear surface of the bumper and movable rearwardly to an access position wherein it extends through an opening in the rear surface; and
    a door attached to the bumper by a hinge connected to a lower edge of the door whereby the door is movable relative to the bumper between a closed position closing off the opening when the tray is in the stowed position and an open position permitting movement of the tray to the extended position, the door having a guide feature comprising a portion of a locking mechanism for securing the door in the closed position, disposed thereon engaging the tray when the tray is moved toward the extended position to stabilize movement of the tray.

13. The apparatus according to claim 12 wherein the locking mechanism is operatively connected with a central vehicle locking system.

14. The apparatus according to claim 12 wherein the locking mechanism is actuated by a remote control device carried by a vehicle operator.

* * * * *